M. P. & M. C. CHAPMAN.

Driven or Bored Wells.

No. 6,556. Reissued July 27, 1875.

WITNESSES

J. H. Lawton

F. F. Herring

INVENTORS.

Matthew P. Chapman

Mark C. Chapman

By Ridley & Warner

Attys

N. PETERS, PHOTO-LITHOGRAPHER, WASHINGTON, D. C.

UNITED STATES PATENT OFFICE.

MATTHEW T. CHAPMAN AND MARK C. CHAPMAN, OF AURORA, ILLINOIS.

IMPROVEMENT IN DRIVEN OR BORED WELLS.

Specification forming part of Letters Patent No. 131,500, dated September 24, 1872; reissue No. 6,556, dated July 27, 1875; application filed August 14, 1874.

*To all whom it may concern:*

Be it known that we, MATTHEW T. CHAPMAN and MARK C. CHAPMAN, of Aurora, in the county of Kane and State of Illinois, have invented certain new and useful Improvements in Driven or Bored Wells; and the following description, in connection with the accompanying drawing, is a full, clear, and exact specification of our improvements, and will enable others skilled in the art to which our invention appertains to make and use the same, and to distinguish from former constructions that which we claim as new.

Our invention relates to that class of devices to raise water, and commonly known as driven pumps. Our object is to provide improved means for producing a tight joint between the outer wall or tubing and the removable parts arranged therein, and to improve the construction and operation of wells of this class. To this end our invention consists in certain novel features relating to the construction of certain parts of the well or pump, and hereinafter fully described, and particularly set forth at the end hereof.

Figure 1:
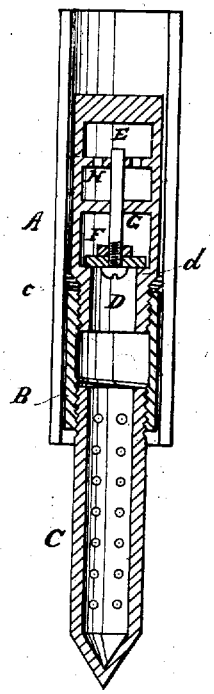
Figure 2:
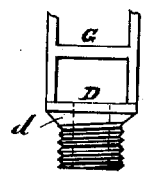

In the drawing, Figure 1 is a sectional elevation of our improved pump, and Fig. 2 an elevation of the valve-seat.

A is the water or oil conductor, which consists of a cylinder or barrel driven to the bottom of the bore. B is a coupling arranged within the part A, and having a circumference such that it may be readily inserted into, and removed from, the said part. C is the strainer, which is fitted to the lower end of the coupling. D is the valve-seat. The valve-seat is secured to the upper end of the coupling, and is provided with an annular beveled or flaring flange, *d*, between which and the upper end of the coupling is placed a flexible packing, *c*. The rod E, attached to the valve F, works in circular apertures or guides cut in the cross-piece G and strainer H of the valve-seat. This strainer consists of a circular disk provided with apertures, and is used for the purpose of preventing foreign substances from falling upon and interfering with the action of the valve.

The operation of our improved device is as follows: The tube A having been sunken, say, a hundred feet, until water is reached, the coupling B, with the strainer C attached thereto, is dropped into the said tube, and made to assume the position shown in Fig. 1. The valve-seat is forced down upon the packing *c*, thus crowding the latter outwardly against the tube A, and creating a tight joint between the said tube and the coupling, or between the valve-seat and the said tube. By this means the surface-water is shut off, and the removable parts are secured to each other and to the outer tube with sufficient firmness to admit of the proper action of the valve.

Having thus described our invention, what we claim as new and essential thereto, and desire to secure by Letters Patent, is—

The beveled flange or shoulder *d* on the removable valve-seat, in combination with the flexible packing *c*, arranged between the said shoulder and the removable part to which the seat is adjustably attached, substantially as and for the purposes specified.

MATTHEW T. CHAPMAN.
MARK C. CHAPMAN.

Witnesses:
S. W. THATCHER,
L. TITSWORTH, Jr.